United States Patent [19]

Keng

[11] Patent Number: 5,543,010

[45] Date of Patent: Aug. 6, 1996

[54] DOCUMENT PROTECTING APPARATUS

[76] Inventor: Leigh L. Keng, 1091 Cobb Pkwy., SE, Marietta, Ga. 30062

[21] Appl. No.: 300,312

[22] Filed: Sep. 2, 1994

Related U.S. Application Data

[62] Division of Ser. No. 55,300, May 5, 1993, Pat. No. 5,362,540.

[51] Int. Cl.[6] ..................... B29C 6/00
[52] U.S. Cl. .................. 156/285; 156/253; 156/230; 156/322; 156/273.3; 283/70; 283/72; 283/77; 283/81; 283/113; 283/901
[58] Field of Search ..................... 156/220, 230, 156/224.24, 273.3, 244.24, 322, 253, 324, 277, 250; 283/70, 77, 109, 114, 91, 72, 85, 81, 113, 901; 428/203, 76, 910

[56] References Cited

U.S. PATENT DOCUMENTS

| | | | |
|---|---|---|---|
| 4,047,996 | 9/1977 | Kanzelberger | 156/220 |
| 4,077,824 | 3/1978 | Paulson et al. | 156/244.24 |
| 4,151,666 | 5/1979 | Raphael et al. | 40/2.2 |
| 4,158,587 | 6/1979 | Keller et al. | 156/216 |
| 4,545,838 | 10/1985 | Minkus et al. | 156/220 |
| 5,211,424 | 5/1993 | Bliss | 281/15.1 |

*Primary Examiner*—Patrick J. Ryan
*Assistant Examiner*—Merrick Dixon
*Attorney, Agent, or Firm*—James B. Middleton

[57] ABSTRACT

A document laminate includes laminating sheets with adhesive on facing sides to laminate a document between the sheets, and shielding sheets covering the document and received within the laminating sheets. When the adhesive is heat activated, the shielding sheets are selected to be not degraded by the activating heat. A document can therefore be removed from the laminate by cutting along a line at one edge of the shielding sheets, and removing the document, which is not adhered to the shielding sheets or the laminating sheets.

3 Claims, 1 Drawing Sheet

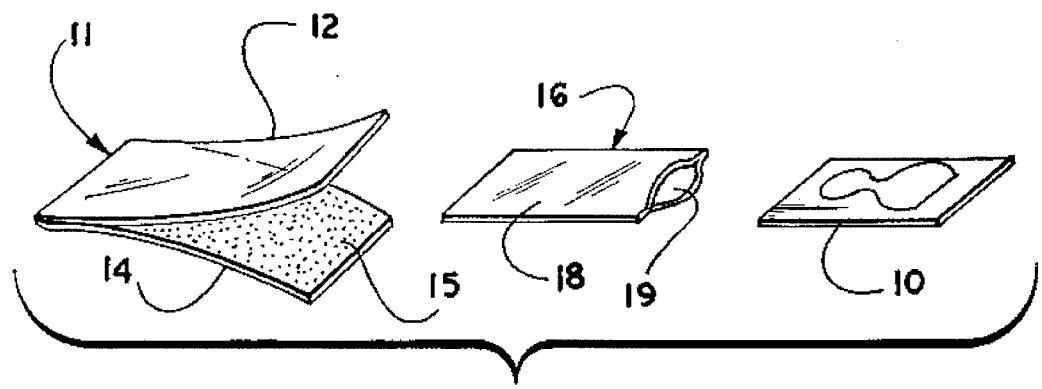
Fig_1
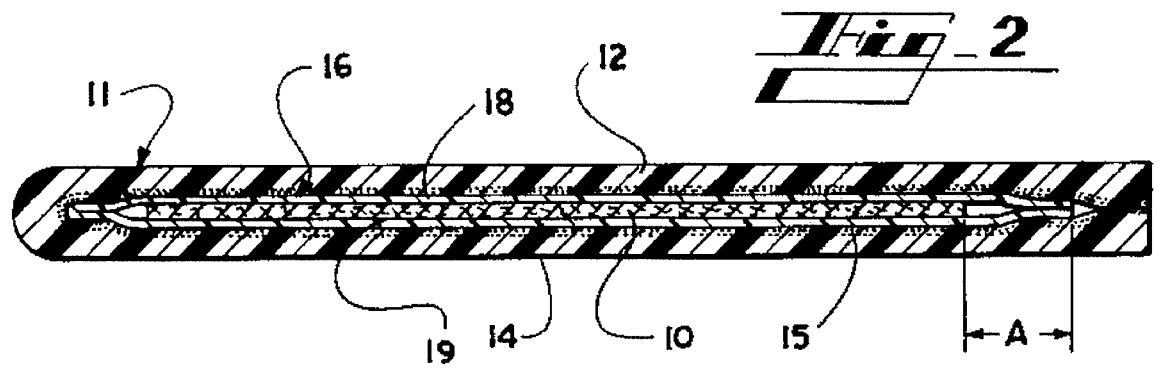
Fig_2
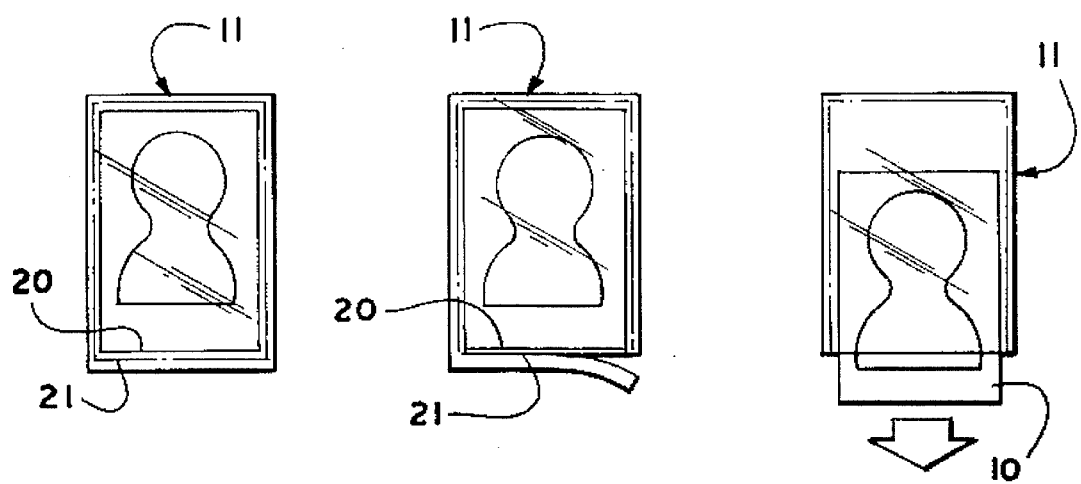
Fig_3  Fig_4  Fig_5

DOCUMENT PROTECTING APPARATUS

CROSS REFERENCE TO RELATED APPLICATION

This application is a division of the application by the same inventor, filed May 5, 1993, having Ser. No. 08/055,300, now U.S. Pat. No. 5,362,540.

BACKGROUND OF THE INVENTION

1. Field of the Invention

This invention relates generally to the laminating of documents, and is more particularly concerned with a method and apparatus for protecting documents to allow the document to be removed from the laminate.

2. Discussion of the Prior Art

Numerous documents are laminated or sealed between transparent sheets of plastic sheet material in order to protect the document. Such lamination is quite valuable for documents of paper or the like that are to be handled. Frequent handling degrades paper documents through folding and unfolding, and absorption of oil from hands. If the ink on the document is water soluble there is the further danger that moisture on the hands will smear the ink, so the document may become illegible. Of course drawings, photographs and the like are also laminated for protection and preservation.

The common lamination of small documents includes the use of opposed sheets of plastic material, with a heat softenable adhesive on facing sides of the sheets. The document to be laminated is placed between these sheets, and the assembly is heated to soften the adhesive, and pressed to cause the adhesive to stick firmly to the document and the opposed sheet. After a brief cooling period, excess material can be cut away. The document is then firmly adhered to the two opposed plastic sheets because the adhesive covers adjacent sides of the entire sheets. As a result, the document cannot be removed from the lamination without completely destroying the document.

The above described process and apparatus serve well if a document can be sealed and never removed; however, there are some documents that need to be protected, but must subsequently be removed from the protection. By way of example, one may wish to protect postage stamps or baseball cards for occasional showing; but, valuable collectors items would lose their value if they were permanently adhered to plastic sheets. Thus, the prior art lamination technique cannot be used on these and other items that must be preserved in their original state.

SUMMARY OF THE INVENTION

The present invention provides a document protection apparatus including transparent shield means covering a document to be laminated, the shield means being then sealed into the plastic sheets so the document is laminated. The shield means extends completely over both sides of the document, and preferably slightly therebeyond, so the document itself will not be adhered to the plastic laminating sheets.

The shield means is preferably a transparent plastic sheet material having a sufficiently high melting point that the material of the shield means will not be softened at laminating temperature. As a result, the document will not be adhered to the material of the laminate, and can be removed by cutting the laminate to expose an edge of the document.

BRIEF DESCRIPTION OF THE DRAWINGS

These and other features and advantages of the present invention will become apparent from consideration of the following specification when taken in conjunction with the accompanying drawings in which:

FIG. 1 is an exploded perspective view showing a document to be laminated in accordance with the present invention;

FIG. 2 is an enlarged, longitudinal cross-sectional view of a laminated document in the apparatus of the present invention, and;

FIGS. 3, 4 and 5 are rather schematic plan views showing removal of the document from the laminate of the present invention.

DETAILED DESCRIPTION OF THE EMBODIMENT

Referring now more particularly to the drawings, and to that embodiment of the invention here presented by way of illustration, FIG. 1 shows the lamination assembly exploded to show all the parts of the assembly. There is a document 10 to be laminated, and there is a folded sheet 11 which is a conventional device for laminating documents. The laminating device 11 includes, as here shown, a folded sheet formed of a polymeric material.

Those skilled in the art will readily understand that the laminating device 11 may comprise two separate sheets, an envelope or the like. So long as there is a sheet to be received on each side of the document, such as the sheets 12 and 14, the specific arrangement can be varied to suit personal preferences. The facing surfaces of the sheets 12 and 14 are covered with an adhesive, as indicated at 15. The adhesive 15 is conventional, and may be softenable by heating, but to relatively low temperatures, or may be active at ambient temperature. Again, use of such adhesives is well known to those skilled in the art, and the conventional adhesives are usable with the present invention.

At this point, it should be recognized that the prior art includes the use of the laminating device 11 which will receive the document 10. With the document 10 received between the sheets 12 and 15, one would heat the device 11 (if the adhesive requires heating) and press the sheets 12 and 15 together to create the laminate. In accordance with the present invention, however, a shield device 16 is placed between the document 10 and the sheets 12 and 14.

Since the prior art arrangement includes the adherence of the sheets 12 and 14 directly to the document 10, the prior art arrangement is not desirable for a valuable document, or a document that, for any other reason, must be preserved in its original state. The shield device 16 is therefore interposed between the document 10 and the laminating device 11 to prevent direct adherence of the sheets 12 and 14 to the document 10.

The shield device 16 may be formed of any of numerous materials. The requirements are: that the material be transparent, and this may be only contact transparency though full transparency may be desirable when great clarity is desired; and, that the material not be degraded at laminating temperatures. These requirements are easily met by numerous plastic sheets since most plastics have reasonably good transparency, and the laminating temperature is so low that even a material such as a low density polyethylene can be used. One material that has been found to be quite good is a polypropylene, but it will be understood that polyester, polyvinylidene chloride, polycarbonate and other well known materials may be used as desired.

As shown in FIG. 1 of the drawings, it will be noted that the shield device 16 is formed as an envelope, closed on three sides. As with the laminating device 11, it should be understood that the important feature is that there are two sheets 18 and 19 to be disposed on the two sides of the document 10. Again, tile shield device 16 may be two separate sheets, or may be joined on one edge, two edges or three edges.

Attention is now directed to FIG. 2 of the drawings. FIG. 2 is a longitudinal cross-sectional view taken through the device after the document 10 has been laminated, with the shield device 16. It will be noticed that the entire shield device 16 is adhered to the laminating device 11, but the document 10 is protected from the adhesive by the shield device. As a result, if one wishes to remove the document 10, one can cut the laminate along a cutting line between the edge of the document 10 and the edge of the shield device 16. In FIG. 2, one area for a cutting line is indicated at A, and it will be understood that an area A exists at each of the four edges of the document 10.

Looking then, at FIGS. 3–5, in the laminate shown in FIG. 3, one can see the edge 20 of the document 10, and the edge 21 of the shield device 16. By cutting between these edges 20 and 21, as indicated in FIG. 4, the envelope of the shield device 16 will be opened, and the document 10 can be removed as shown in FIG. 5.

It will therefore be seen that the present invention provides a conventional lamination of documents, but with shield means to protect the document and allow subsequent removal of the document from the laminate. The laminate will protect the document, and may be permanently retained; however, one may cut the edge of the laminate to open the envelope carrying the document, and the document is easily removable without damage to the document.

It will of course be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

I claim:

1. A method for temporarily laminating a document comprising the steps of placing transparent shield means on both sides of said document with said shield means extending slightly beyond said document, and subsequently sealing said transparent shield means with said document therein within a laminating device, said step of sealing said shield means within a laminating device including the steps of placing said shield means with said document therein between adhesive covered sheets of a laminating device, and urging said adhesive covered sheets together so that the adhesive will contact said shield means while said shield means protects said document from the adhesive.

2. A method as claimed in claim 1, and further including the step of heating said sheets of said laminating device immediately before the said step of urging said adhesive covered sheets together.

3. A method as claimed in claim 1, and further including the step of removing said document from said shield means and laminating device after the said step of sealing said shield means within a laminating device, said step of removing said document including the steps of cutting said laminating device and said shield means along a cutting line between said document and an edge of said shield means, and then removing said document.

\* \* \* \* \*